(12) United States Patent
Fink (10) Patent No.: US 7,047,260 B1
(45) Date of Patent: May 16, 2006

(54) SELECTING TREE SUMMARY OPERATIONS FOR A TREE

(75) Inventor: Ronald Fink, Huntingdon Valley, PA (US)

(73) Assignee: NCR Corp., Dayton, OH (US)

( * ) Notice: Subject to any disclaimer, the term of this patent is extended or adjusted under 35 U.S.C. 154(b) by 566 days.

(21) Appl. No.: 10/244,202

(22) Filed: Sep. 16, 2002

(51) Int. Cl.
  *G06F 17/30* (2006.01)
(52) U.S. Cl. .................................. 707/203; 707/10
(58) Field of Classification Search ............. 707/1–10, 707/100–104.1, 200–205
  See application file for complete search history.

(56) References Cited

U.S. PATENT DOCUMENTS

| | | | |
|---|---|---|---|
| 4,868,743 A | 9/1989 | Nishio | 364/200 |
| 5,257,365 A | 10/1993 | Powers et al. | 395/600 |
| 5,603,021 A * | 2/1997 | Spencer et al. | 707/4 |
| 5,875,445 A * | 2/1999 | Antonshenkov | 707/2 |
| 6,175,835 B1 * | 1/2001 | Shadmon | 707/102 |
| 6,260,042 B1 | 7/2001 | Curbera et al. | 707/101 |

* cited by examiner

*Primary Examiner*—Mohammad Ali
(74) *Attorney, Agent, or Firm*—Schwegman, Lundberg, Woessner & Kluth (57) ABSTRACT

Methods, systems, and executable instructions are provided for selecting an optimal tree summary operation. Tree summary operations are evaluated based on their efficiencies in calculating a tree summary from a tree having a plurality of nodes. Moreover, in one embodiment, by using tree constants and processing constants the efficiencies of the tree summary operations are determined. Once the efficiencies of the tree summary operations are determined, one of the tree summary operations is selected as an optimal tree summary operation for calculating the tree summary of the tree.

12 Claims, 4 Drawing Sheets

SELECTING TREE SUMMARY OPERATIONS FOR A TREE

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2002, NCR Corp. All Rights Reserved.

FIELD OF THE INVENTION

The present invention relates to selecting an optimal tree summary operation for a tree. More specifically, the present invention is directed to methods, systems and executable instructions that determine the efficiencies of tree summary operations for a tree and selects a tree summary operation having the best efficiency for calculating a tree summary.

BACKGROUND OF THE INVENTION

A large database can include voluminous amounts of data organized as columns and rows within tables of the database. Sometimes, specific types of summary data need to be calculated for the entire database. When a summary operation is executed, the performance of the database can be negatively impacted as the summary operation consumes resources used by the database. Thus, it is desirable to select a summary operation that minimizes its impact to the database when processing.

Accordingly, prior to processing, the data included within the database may often be efficiently viewed as a tree data structure to improve processing throughput when an operation is performed against the entire database. The tree data structure can be derived from relationships included within the data. For example, each cell of a database includes a row name and a column name; however, each cell can also include a right child link, a left child link, and a parent link. If a cell has a null parent link, then it is deemed the root of the tree. If a cell has one or more null children links, then it is deemed a leaf node of the tree. Moreover, a cell is often referred to as a node, and the node can be designated as a parent node, a child node, a sibling node, a root node, and/or a leaf node.

Once the database is viewed and processed as a tree data structure, a proper selection of a tree summary operation that will efficiently traverse the tree is important. An incorrect selection of a tree summary operation can substantially increase resource (e.g., processor and memory) consumption and thereby adversely impact the processing throughput of the database.

Conventionally, the selection of a tree summary operation is done when the database is first designed, and the summary operation remains in use regardless of the changed state of the tree. As a result, a poor initial choice of a tree summary operation can remain problematic until manual analysis is done to select a better performing tree summary operation. Moreover, any subsequent change to add a new tree summary operation is often done in an ad hoc manner or through manual analysis, and although the subsequent selection may be an improvement over the initial tree summary operation selection, there are no automatic techniques that are used to select the most efficient tree summary operation.

As a result, present techniques rely on chance and manual analysis to improve the operational performance of any selected tree summary operation. Furthermore, in some cases, additional data structures may need to be implemented in order to support a particular tree summary operation. For example, one tree summary operation operates and maintains a tree summary by keeping track of summaries at various levels within the tree. When a lower level summary is changed than all the summaries at a higher level are updated to reflect the lower level summary change. In other cases, no additional data structures are needed at all, since the tree summary operation traverses the entire tree visiting each node of the tree when calculating a tree summary. In still other cases, summaries are stored separately from the tree and when a particular node changes, the stored summaries are updated to reflect the changed node. Further, such changes to a working database after initial loading can be extremely time-consuming and disruptive to productive use of a system.

Thus, even when a new tree summary operation is desired because the performance of an existing tree summary operation is not acceptable, it may still be time consuming and expensive to implement a new tree summary operation. This is so, because additional data structures may need to be integrated into the original database design in order to support a new tree summary operation.

As is apparent, there exists a need for improving techniques that identify and select optimal tree summary operations for a tree, where the tree is a logical representation of a database. Moreover, there exists a need to derive an algorithm that can be used to predict the performance of one or more tree summary operations, when attributes of the tree change.

SUMMARY OF THE INVENTION

In various embodiments of the present invention techniques are described for selecting an optimal tree summary operation. Two or more tree summary operations are evaluated for their individual efficiencies in determining a summary of information contained in nodes of a tree. The best efficiency is presented as the optimal tree summary operation that should be used when calculating the summary of information.

More specifically and in one embodiment of the present invention, a method to determine an optimal tree summary operation technique is presented. A ratio of a total number of summaries to update within a tree over a total number of nodes within the tree is determined. Moreover, a percentage of updated nodes within the tree versus the total number of nodes in an examination period are determined. Further, a processing speed ratio for a first tree summary operation over a second tree summary operation is determined. Next, the first tree summary operation, the second tree summary operation, and a third tree summary operation are selected by using the ratio, the percentage, and the processing speed ratio.

Another embodiment of the present invention, a tree summary operation selection system is provided. The tree summary operation selection system includes a tree having a plurality of nodes, and a first tree summary operation that calculates a tree summary by evaluating each of the nodes within the tree. Moreover, the tree summary operation selection system includes a second tree summary operation that stores node summaries with each of the nodes and calculates the tree summary by maintaining the tree summary and updating the tree summary when node summaries are changed. Further, the tree summary operation selection system includes a third tree summary operation that stores tree level summaries for levels included within the tree and calculates the tree summary by maintaining the tree summary and updating the tree summary by updating higher levels of the tree level summaries when a lower level tree level summary is changed. Also, the tree summary operation selection system includes a selection application that determines efficiencies for each of the operations and selects one of the operations based on the operation having a highest efficiency.

In yet another embodiment of the present invention a tree summary selection set of executable instructions operable to process in a computer readable medium is described. The tree summary selection set of executable instructions receives a plurality of tree summary operations, a set of tree constants, and a set of test data used to acquire processing constants associated with calculating a tree summary. Moreover, the tree summary set of executable instructions identifies a tree and evaluates each of the tree summary operations using the tree, the tree constants, and the processing constants. In addition, the tree summary selection set of executable instructions selects one of the tree summary operations based on the evaluation.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

As used herein a tree refers to a data structure implemented logically in a computer readable medium. The tree need not be a binary tree or a balanced tree, although in some instances of the present disclosure the tree can be a binary tree and/or a balanced tree. In some embodiments, the tree logically represents a database where each node of the tree can also be viewed as a cell of the database. The nodes of the tree include attributes and relationships to other nodes of the tree. Some of the nodes include data that when accumulated represents a summary of the tree for that particular data. For example, nodes of the tree can include data representing the number of units sold, such that when each of the nodes is tabulated a total number of units sold for the entire tree are acquired.

In various embodiments of the present disclosure, the tree logically represents a store having products, and is stored in a Teradata database distributed by NCR Corporation of Dayton Ohio. Of course as one of ordinary skill in the art readily appreciates the tree can represent any associations and can be stored in any database. All such representations and databases are intended to fall within the broad scope of the present invention.

Figure 1:
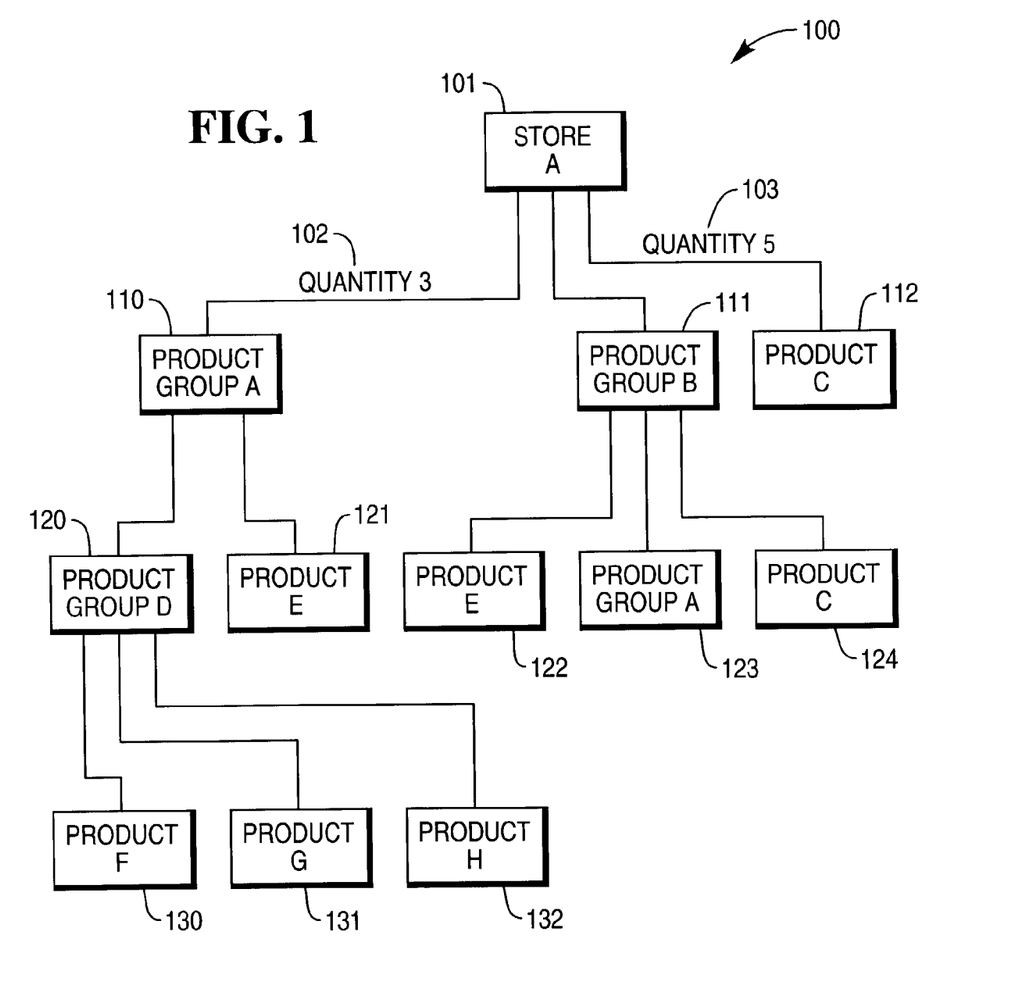
FIG. 1 is a diagram representing an example tree data structure.

FIG. 1 illustrates a diagram representing one example of a tree data structure 100. The tree data structure 100 depicted in FIG. 1 is not a binary tree, since each node can have more than 2 children. The tree data structure includes four levels, where level 1 is the root node 101, the second level includes nodes 110–112, the third level includes nodes 120–124, and the fourth level includes nodes 130–132. Moreover, nodes within the tree 100 can be repeated at multiple levels within the tree 100. For example, node 110 appears at level 2 and again as node 123 at level 3.

The tree 100 in FIG. 1 logically represents a store having a plurality of product groupings and products. The root node 101 is a node representing the store itself; the descendants of the root node 101 include the product groupings and the products within the store. Each node includes attributes (e.g., price, description, and the like). Moreover, nodes are associated with each other through links, and in some instances the links include other relationships, such as quantities (e.g., 102–103). Furthermore, although the tree 100 is depicted having four levels, there is no limit on the number of levels that can be represented within the tree 100.

The tree 100 depicted in FIG. 1 often requires summarization to acquire information about the entire tree. For example, tree 100 can be summarized to acquire the total price of all remaining products within the tree 100. Or, the tree 100 can be summarized to acquire the total quantity of all products within the tree 100. However, as the tree 100 is modified the summaries can be altered. For instance, when the prices of the products are discounted or when products are sold or removed from inventory. Correspondingly, the ability to efficiently update the tree summaries becomes important and the selection of an operation will determine how efficient the summaries are maintained or acquired when needed.

One tree summary operation (Operation 1) can be implemented such that when a summary request is made, the tree summary operation traverses the entire tree 100 visiting each node of the tree in order to calculate a tree summary. Another tree summary operation (Operation 2) can acquire a tree summary by maintaining a running total for the tree summary and storing summary totals for each node, such that when an individual node summary changes; the tree summary operation calculates the effect of the change on the remaining summaries and updates the running total. A third tree summary operation (Operation 3) stores the summaries at various levels within the tree 100, and when a summary at a lower level is changed, all summaries are updated at higher levels within the tree 100 to acquire the tree summary.

The tree 100 also includes a variety of factors or attributes as a whole. For example, the tree 100 can include the total number of levels within the tree 100, a total number of nodes within the tree, a total number of relations between nodes within the tree, and others. Additionally, some factors can be provided as constants, such as relative importance of total storage size when maintaining the tree 100, relative urgency of timely acquiring tree summaries when requested, and the like. Moreover, some factors can be computed, such as average number of relations between two nodes, frequency with which the tree 100 is updated, frequency with which tree summaries are requested, number of attributes summarized within a node, number of summarized attributes within a relation, and the like.

In various embodiments of the present invention, the tree 100 and the tree factors are acquired and/or derived. Next, a selection operation uses a set of supplied test data to test each of the tree summary operations discussed above. In testing the tree summary operations, a number of processing constants or factors are discovered for each of the tree summary operations. For example, a ratio of processing speed between Operation 1 and Operation 2 is acquired. Running the test data against Operation 1 to acquire a processing speed of Operation 1, and running the test data against Operation 2 to acquire a processing speed of Operation 2 results in the ratio of processing speed (e.g., speed Operation 1 divided by speed Operation 2).

While using the test data, an arbitrary examination period (P) is selected, and the percentage of nodes that are modified during P versus the total number of nodes in the tree results in a percentage of elements updated ratio. Furthermore, a ratio is calculated based on the number of summaries examined divided by the number of nodes updated while running the test data.

The processing speed ratio, the percentage of nodes updated, and the ratio of node examinations are used with a number of tree factors/constants by the selection application to select Operation 1, Operation 2, or Operation 3. The selection results in the most efficient tree summary operation being selected for processing the tree 100 for tree summaries. The selection application selects Operation 1 when the processing speed is high, the ratio of nodes examined is close to 0, the importance of tree storage size is high, and urgency of timely acquiring a tree summary when requested is low. The selection application selects Operation 2 when the urgency of timely acquiring a tree summary when requested is high, the processing speed is small, the ratio of nodes examined is close to 1, and the importance of tree storage size is high. The selection application selects Operation 3 when the urgency of timely acquiring a tree summary when requested is low, the processing speed is small, the ratio of nodes examined is close to 1, and the importance of tree storage size is low.

Thus, as the urgency of acquiring timely tree summaries rises Operation 1 becomes favored over Operation 2. Moreover, as the importance of tree storage size diminishes Operation 3 becomes favored. Once the test data is used to acquire the favored operation, the ratios, the percentage, then a number of algorithms can be subsequently used to determine the favored Operation when tree factors or constants are subsequently altered. This is achieved by processing the three operations to acquire and determine a number of processing constants that show the relationship between various tree factors. Each operation is processed against the test data to acquire the most efficient operation. Next, the constants contained in the algorithms are supplied integer values, such that the algorithms evaluate to true, based on what was observed when processing the operations with the test data. In this way, the derived constants supply the relationships between tree factors and subsequent values for the tree factors can be supplied to determine which of the three operations will be the most efficient in acquiring tree summaries for the tree 100.

For example, consider tree 100 having the following tree factors:

Input 1=total number of nodes;
Input 2=average number of relations per node;
Input 3=total number of tree levels;
Input 4=average number of node changes per update;
Input 5=frequency of updates within a given period;
Input 6=frequency of examination of summaries within the given period;
Input 7=number of summarized attributes in the nodes;
Input 8=number of summarized attributes in the relations;
Input 9=importance of total storage size for the tree 100; and
Input 10=urgency of time in acquiring tree summaries.

With these the following algorithms define factors/inputs for the efficiencies of each of the operations in calculating tree summaries:

Efficiency of Operation 1 ($M1$)=$K1$*(Input 9/Input 10)+$K2$/input4+$K3$*Input 3+$K4$*(Input 6/Input 5)+$K14$/Input 1;

Efficiency of Operation 2 ($M2$)=$K5$*(Input 9/Input 10)*$K6$/input 3+$K7$/Input 5+$K8$*Input 6+$K15$*Input 1; and Efficiency of Operation 3 ($M3$)=$K9$*(Input 9/Input 10)+$K10$/Input 4+$K11$/Input 3+$K12$*Input 6+$K13$/Input 5.

The processing constants K1–K15 are acquired by processing the operations and then substituting values into the above efficiency algorithms, such that the 3 algorithms conform to the processing results. Once all three efficiency algorithms are true with the substituted processing constants, then the values for the factors/inputs can be altered and the appropriate Operation will be identified without the need to use additional test data. Moreover, in some cases the real data defined in the database may not statistically resemble the test data used, in those cases by altering the Input/factor values and evaluating the above efficiency algorithms, the most efficient operation is readily determined. Furthermore, the highest value for M1, M2, or M3 determines the most efficient operation to use when calculating tree summaries. Furthermore, in some embodiments, Inputs 2, 7, and 8 can be used to adjust for the types of databases having the tree 100. In this way, if the database and its internal operations affect the operational efficiency of the operations being evaluated, these inputs/factors can be used to adjust for the discrepancies. Moreover, if M3 (Operation 3) has the highest efficiency, then the recommended level (RL) of summaries can be defined by: RL=$K16$*(Input 9/Input 10)+$K17$*Input 3.

As one of ordinary skill in the art now appreciates, a database can be represented as a tree 100. A set of test data can then be used along with a number of tree factors/inputs to determine an optimal tree summary operation for acquiring tree summaries from the tree 100. The processing of each of the operations using the tree 100 and the test data results in values for processing constants. The processing constants are substituted into the above efficiency algorithms so that they conform to the processing. Finally, when actual data is used within the tree, the tree factors/inputs can be updated within the algorithms and the optimal tree summary operation determined without the need to perform any additional tests using test data.

Figure 2:
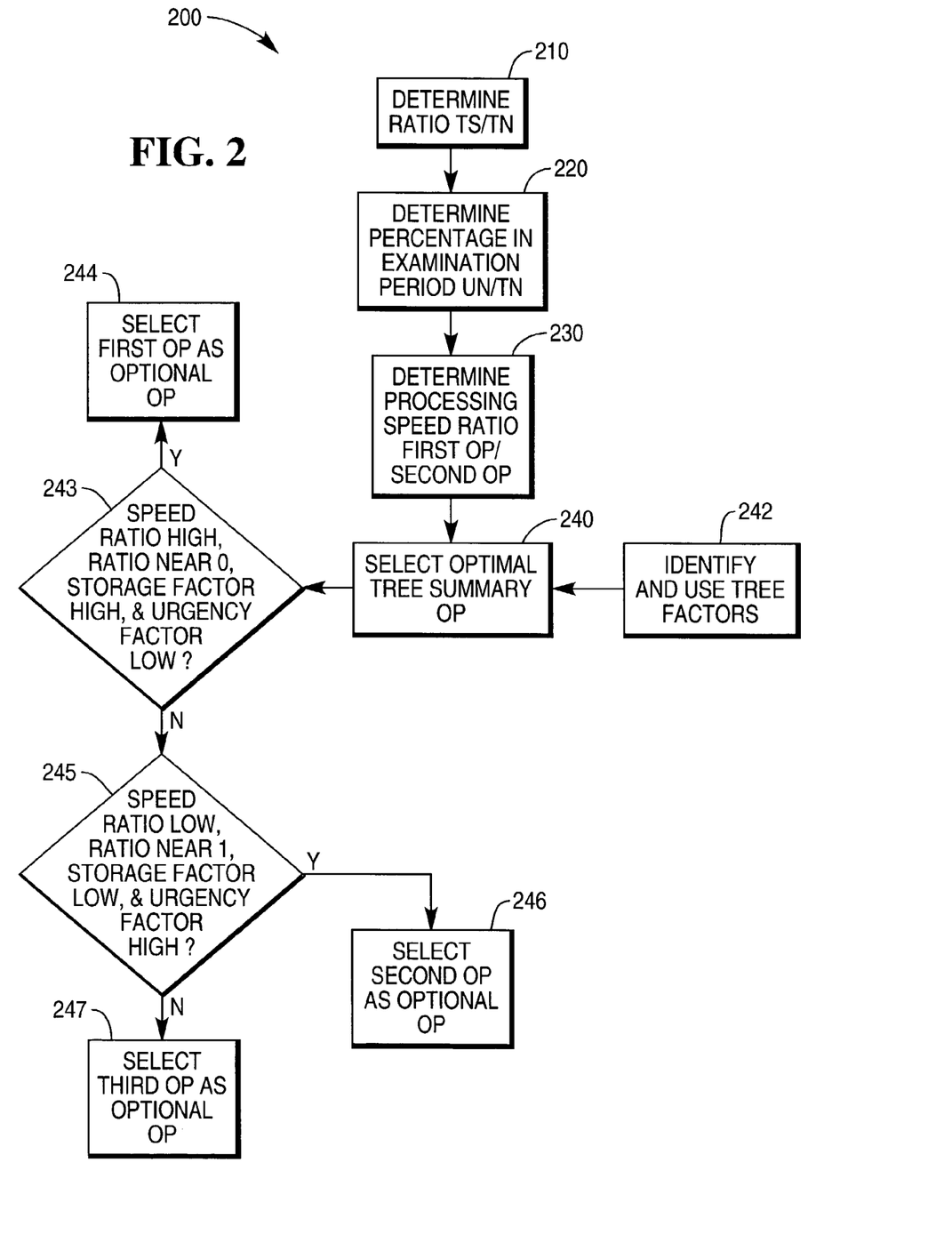
FIG. 2 is a diagram of a flowchart representing a method to determine a tree summary operation, according to the teachings of the present invention.

FIG. 2 is a diagram of a flowchart representing one method 200 to determine a tree summary operation, according to the teachings of the present invention. Initially, a database includes columns and rows that when combined identify cells; the cells are also logically associated to form nodes of a tree. The links between the nodes of the tree include relationships, and the nodes as well as the relationships include attributes. The tree includes a number of factors/constants that are provided or derived from the tree by using historical processing information and/or test data.

Using the tree factors, at 210, a ratio is determined. The ratio represents the total number of summaries (TS) to update with the tree divided by the total number of nodes (TN) within the tree. Next, at 220, a percentage is determined. The percentage represents updated nodes (UN) within the tree divided by TN during a given examination period. At 230, a processing speed ratio is determined. The processing speed ratio is the processing speed of a first tree summary operation divided by the processing speed of a second tree summary operation.

The first tree summary operation is an operation that calculates a tree summary by traversing the tree to visit each node and relation within the tree. The tree summary is then calculated once the first tree summary operation has completely traversed the tree. The second tree summary operation is an operation that stories tree summaries for the nodes of the tree and when a node changes calculates the affect of the change on all the stored tree summaries to determine the tree summary. In some embodiments, a third tree summary operation is provided, where summaries are stored at various levels within the tree and when a summary changes, all higher level summaries are updated to reflect a lower level change.

At 240, one of the tree summary operations is selected as an optimal tree summary operation for the tree by using the ratio, the percentage, and the processing speed. In one embodiment, at 242, tree factors/inputs are also used when selecting the optimal tree summary operation. For example, at 243, if the processing speed ratio is high, the ratio nears 0, a storage size importance factor for the storage size of the tree is high, and an urgency factor for timely acquiring a tree summary is low, then in 244 the first tree summary operation is selected as the most optimal tree summary operation for the tree.

However, if the expression evaluated at 243 is false, then a check is made at 245 to determine if the processing speed ratio is low, the ratio nears 1, the storage importance factor is low, and the urgency factor is high. If this evaluates to true, then at 246 the second tree summary operation is selected as the most optimal tree summary operation for the tree. Otherwise, at 247, the third tree summary operation is selected as the most optimal tree summary operation for the tree.

Additionally, in some embodiments, the third tree summary operation can be affirmatively identified when the processing speed ration is low, the ratio nears 1, the storage importance factor is low, and the urgency factor is low (not depicted in FIG. 2).

In some embodiments of FIG. 2, the optimal tree summary operation is acquired by using test data associated with updating summaries within nodes of the tree and acquiring a tree summary. In these embodiments, as described above with the description of FIG. 1, processing constants can be acquired and substituted into the three tree summary efficiency algorithms (M1, M2, and M3). In this way, once the true tree factors/inputs are known, or are changed, the values can be easily substituted into algorithms M1, M2, and M3 to determine the optimal tree summary operation without the need to perform additional testing and/or analysis. In this way, the teachings of the present disclosure provides a flexible and dynamic technique for adjusting and determining an optimal tree summary operation for a tree after an initial evaluation and as the data within the tree causes the tree structure to change.

Figure 3:
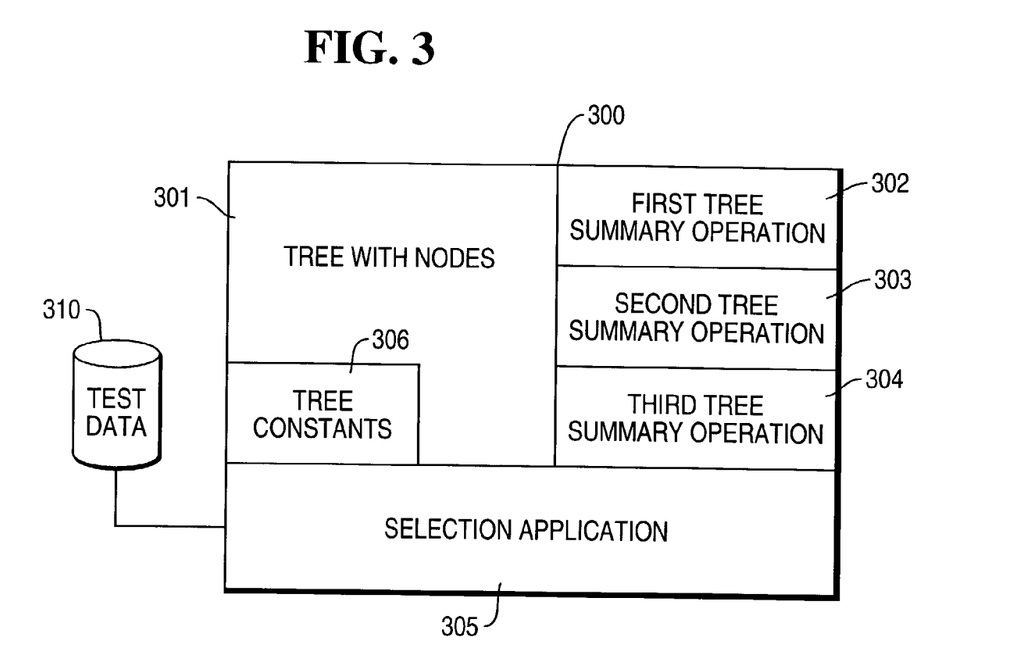
FIG. 3 is a diagram representing a tree summary operation selection system, according to the teachings of the present invention.

FIG. 3 is a diagram representing one tree summary operation selection system 300, according to the teachings of the present invention. The tree summary selection system 300 is embodied in a computer readable medium, or a plurality of computer readable media. The tree summary selection system 300 includes a tree with a plurality of nodes 301, a first tree summary operation, 302, a second tree summary operation 303, a third tree summary operation 304, and a selection application 305.

The nodes 301 include relations and attributes. Moreover, the relations include attributes. In some embodiments, the tree and nodes 301 represents products within a store, and are implemented within a database. Furthermore, the tree includes a number of tree constants/factors/inputs 306. These tree constants 306 can be manually provided or derived from evaluating the tree 301. The constants 306, in some embodiments, include a total number of nodes within the tree 301, an average number of relations within the tree 301, a total number of levels within the tree 301, an average number of changes to nodes within the tree 301 when a tree summary is calculated, a frequency factor for updates to the tree summary, a summary frequency factor indicating the frequency with which updates to node summaries and/or tree level summaries occur, a total number of attributes that are to be summarized for a tree summary, a total number of relations that are to be summarized for a tree summary, a storage importance factor for the size of the tree 301, and an urgency factor for timely acquiring the tree summary.

The first tree summary operation 302 calculates a tree summary by evaluating each node/relation within the tree 301. The second tree summary operation 303 calculates a tree summary by evaluating the impact of stored node summaries when one node changes. The third tree summary operation 304 calculates a tree summary by updating tree level summaries stored at higher levels within the tree 301 when a lower level tree summary changes.

The selection application 305 determines the efficiencies for each of the tree summary operations 302–304, and selects the tree summary operation 302–304 having the highest efficiency rating. In one embodiment, the selection application 305 uses test data 310 and the tree constants 306 to individual process each of the tree summary operations 302–304. After, performing the processing selection application 305 uses processing constants derived from the processing and the tree constants 306 to select an optimal tree summary operation 302–304.

For example, the selection application 305 can determine the operational efficiency of the first tree summary operation 302 by using the storage importance factor, the urgency factor, the average number of changes to the nodes with the test data 310, the frequency factor, the summary frequency factor, and the total number of nodes within the tree 301. These tree constants 306 are then combined with the actual processing results to determine processing constants, as discussed above with FIG. 1, and the equation M1 is used to determine the efficiency rating for the first tree summary operation 302.

Additionally, the selection application 305 determines the efficiency rating of the second tree summary operation 303 by using the tree constants 306 including: the storage importance factor, the urgency factor, the frequency factor, the summary frequency factor, and the total number of nodes within the tree 301. Next, the selection application 305 uses the acquired processing constants, as discussed above with FIG. 1, and the equation M2 is used to determine the efficiency rating for the second tree summary operation 303.

Likewise, the selection application 305 determines the efficiency rating of the third tree summary operation 304 by using the tree constants 306 including: the storage importance factor, the urgency factor, the frequency factor, and the summary frequency factor. Next, the selection application 305 uses the acquired processing constants, as discussed above with FIG. 1, and the equation M# is used to determine the efficiency rating for the third tree summary operation 304.

The selection application picks the tree summary operation 302–303 having the highest value when equations M1–M3 are evaluated. Further, the equations can be re-evaluated when actual data, rather than test data 310, is used for the tree 301. Also, if the tree constants 306 change then the equations M1–M3 can be re-evaluated. In this way, the optimal tree summary operation 302–304 can be changed dynamically as conditions change with the tenets of the present invention.

Figure 4:
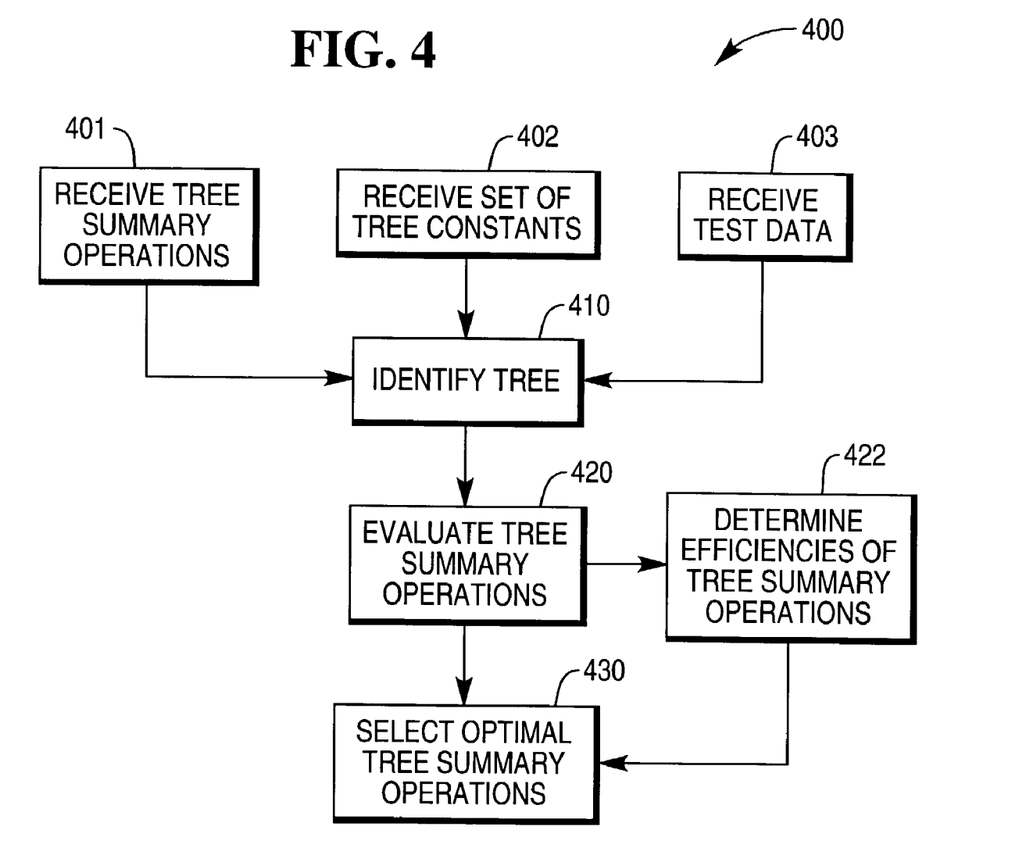
FIG. 4 is a diagram of a flowchart representing the processing of a tree summary selection set of executable instructions, according to the teachings of the present invention.

FIG. 4 is a diagram of a flowchart representing the processing of one tree summary selection set of executable instructions 400, according to the teachings of the present invention. The tree summary selection set of executable instructions (TS) 400 is operable to be processed on a computer readable medium or on a plurality of computer readable media. The TS 400 operates against a tree when supplied tree summary operations and tree constants.

At 401, the TS receives tree summary operations that are used to determine tree summaries for a tree. At 402, the TS also receives a set of tree constants/inputs/factors, some of these tree constants can be derived by the TS when using a set of test data to process the received tree summary operations. Accordingly, at 403, the TS receives a test data that is used to before updates to the nodes of the tree and request tree summaries after the updates. The test data is used to evaluate the processing of each of the received tree summary operations.

At 410, a tree is identified by the TS. In one embodiment, the tree is a representation of a database that houses products within a store. Once, the TS has the tree constants, the tree, the tree summary operations, and the test data, the TS evaluates, at 420, each of the received tree summary operations and acquires processing constants upon conclusion of processing each of the tree summary operations against the test data. The actual results acquired by the test processing are used to supply the processing constants. Next, the actual tree constants indicative of the data actually residing in the tree and the processing constants are supplied to the equations M1–M3, as defined above with FIG. 1. After evaluating the equations M1–M3, the efficiencies for three summary operations is known, at 422, and the TS selects, at 430, the most efficient tree summary operation to perform tree summary operations on the tree.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A computer-implemented method to determine a tree summary operation, comprising:
    determining a ratio of a total number of summaries to update within a tree over a total number of nodes within the tree;
    determining a percentage of updated nodes within the tree versus the total number of nodes in an examination period;
    determining a processing speed ratio for a first tree summary operation over a second tree summary operation;
    selecting one of the first tree summary operation, the second tree summary operation, and a third tree summary operation by using the ratio, the percentage, and the processing speed ratio; and
    wherein in selecting, the first tree summary operation is an operation that recalculates a tree summary by evaluating nodes of the tree to acquire the tree summary and wherein the second tree summary operation calculates the tree summary by storing node summaries for each of the nodes and when one of the node summaries changes updates any affected node summary to recalculate the tree summary, and wherein the third tree summary operation stores tree level summaries at tree levels within the tree and when one of the tree level summaries changes recalculates the tree summary by updating a number of the tree level summaries that occur above the tree level summary that was changed.

2. The method of claim 1, wherein in selecting, one of the operations are selected by also using a total storage size importance factor and an urgency factor for acquiring a tree summary.

3. The method of claim 2, wherein in selecting, the first tree summary operation is selected when the processing speed ratio is high, the ratio nears 0, the total storage size importance factor is high, and the urgency factor is low.

4. The method of claim 2, wherein in selecting, the second tree summary operation is selected when the processing speed ratio is low, the ratio nears 1, the total storage size importance factor is low, and the urgency factor is high.

5. The method of claim 2, wherein in selecting, the third tree summary operation is selected when the processing speed ratio is low, the ratio nears 1, the total storage size importance factor is low, and the urgency factor is low.

6. The method of claim 1 wherein in determining the ratio, the tree represents products within a store.

7. A tree summary operation selection system, comprising:
    a tree having a plurality of nodes;
    a first tree summary operation that calculates a tree summary by evaluating each of the nodes within the tree;
    a second tree summary operation that stores node summaries with each of the nodes and calculates the tree summary by maintaining the tree summary and updating the tree summary when node summaries are changed;

a third tree summary operation that stores tree level summaries for levels included within the tree and calculates the tree summary by maintaining the tree summary and updating the tree summary by updating higher levels of the tree level summaries when a lower level tree level summary is changed;

a selection application that determines efficiencies for each of the operations and selects one of the operations based on the operation having a highest efficiency; and wherein the selection application determines the efficiencies by using a number of tree constants, and wherein the constants include a total number of nodes within the tree, an average number of relations within the tree, a total number of levels within the tree, an average number of changes to the nodes within the tree when the tree summary is calculated, a frequency factor in which updates to the tree summary occur, a summary frequency factor in which updates to the node summaries and/or the tree level summaries occur, a total number of attributes that are to be summarized within the nodes of the tree, a total number of relations that are to be summarized within the nodes of the tree, a storage importance factor, and an urgency factor for acquiring the tree summary.

8. The tree summary operation selection system of claim 7, wherein the selection application determines the first tree summary operation efficiency by using the storage importance factor, the urgency factor, the average number of changes to the nodes, the frequency factor, the summary frequency factor, and the total number of nodes within the tree.

9. The tree summary operation selection system of claim 7, wherein the selection application determines the second tree summary operation efficiency by using the storage importance factor, the urgency factor, the frequency factor, the summary frequency factor, and the total number of nodes within the tree.

10. The tree summary operation selection system of claim 7, wherein the selection application determines the third tree summary operation's efficiency by using the storage importance factor, the urgency factor, the frequency factor, and the summary frequency factor.

11. The tree summary operation selection system of claim 7, wherein the selection application uses a set of test data to gather processing constants associated with processing each of the operations to obtain the tree summary, and wherein the tree constants and the processing constants are used when selecting one of the operations.

12. The tree summary operation selection system of claim 11, wherein the selection application uses the set of test data to loop through the tree processing each of the operations.

* * * * *